(12) United States Patent
Walden et al.

(10) Patent No.: US 8,474,412 B1
(45) Date of Patent: Jul. 2, 2013

(54) CARRIER SLING FOR INJURED OR CONVALESCENT PETS

(76) Inventors: Clara S. Walden, Spring, TX (US);
Bruce Walden, Spring, TX (US)

( * ) Notice: Subject to any disclaimer, the term of this patent is extended or adjusted under 35 U.S.C. 154(b) by 0 days.

(21) Appl. No.: 12/967,046

(22) Filed: Dec. 13, 2010

(51) Int. Cl.
*A01K 29/00* (2006.01)

(52) U.S. Cl.
USPC .......................................................... 119/725

(58) Field of Classification Search
CPC ................. A01K 1/03; A01K 1/00; A61D 3/00
USPC ................. 119/496–497, 725–726, 728, 757, 119/816
See application file for complete search history.

(56) References Cited

U.S. PATENT DOCUMENTS

| 136,059 | A | * | 2/1873 | Hohorst | 294/77 |
| 2,427,246 | A | * | 9/1947 | Whittington | 294/142 |
| 2,546,726 | A | * | 3/1951 | Creamer, Jr. | 119/727 |
| 2,976,840 | A | * | 3/1961 | Hugus | 119/727 |
| 4,831,967 | A | * | 5/1989 | Anderson | 119/725 |
| 4,950,014 | A | * | 8/1990 | Smith | 294/152 |
| 5,738,043 | A | * | 4/1998 | Manuel | 119/497 |
| 5,823,146 | A | * | 10/1998 | Alaniz et al. | 119/725 |
| 5,823,594 | A | * | 10/1998 | Hayes et al. | 294/142 |
| 5,842,443 | A | * | 12/1998 | Steinfort | 119/726 |
| 6,142,492 | A | * | 11/2000 | DeLucia | 280/47.331 |
| 6,640,751 | B1 | * | 11/2003 | Cool | 119/727 |
| 6,802,282 | B2 | * | 10/2004 | Muckleroy | 119/497 |
| 7,886,948 | B2 | * | 2/2011 | Kerr | 224/519 |
| 2005/0005875 | A1 | * | 1/2005 | Suggs | 119/728 |
| 2005/0076853 | A1 | * | 4/2005 | Leo | 119/497 |
| 2005/0263102 | A1 | * | 12/2005 | Sherman et al. | 119/792 |
| 2008/0223309 | A1 | * | 9/2008 | Winders | 119/728 |

* cited by examiner

*Primary Examiner* — Rob Swiatek
*Assistant Examiner* — Ebony Evans
(74) *Attorney, Agent, or Firm* — Kenneth A. Roddy (57) ABSTRACT

A carrier sling for supporting and carrying a four-legged animal off the ground has a sling formed of flexible fabric material having leg openings for receiving the forelegs and back legs of the animal that extends along an underside of the animal including the shoulder and hip areas and around the sides of the animal and has a longitudinally extending loop along opposed shorter sides which contain a rigid support rod. Strap handles and a shoulder strap are secured to each shorter side and support rod. When the animal is supported in the sling and lifted by the handles or shoulder strap, the support rods are positioned closely together substantially parallel with one another and extend longitudinally above the animal's back and spine including the shoulder and hip areas to evenly distribute the animal's weight and significantly reduce twisting or bending stresses applied to the axis of the spine.

5 Claims, 4 Drawing Sheets

CARRIER SLING FOR INJURED OR CONVALESCENT PETS

FIELD OF THE INVENTION

This invention relates generally to slings and supports for supporting an animal, and more particularly, to a carrier sling for injured or convalescent pets that supports and assists the mobility of a canine suffering from invertebral disk disease or other spinal and hip disorders or recuperating from surgery related thereto.

BACKGROUND ART

The canine spinal column is made up of four major vertebral regions: cervical (neck), thoracic (mid back), lumbar (lower back) and sacral (pelvic). Dogs have seven cervical, thirteen thoracic, seven lumbar and three sacral vertebrae. There are also variable numbers of coccygeal or tail vertebrae. Intervertebral disks are located between the vertebral bodies starting at the second and third cervical vertebrae (C2-3) and extending to the seventh lumbar and first sacral vertebrae (L7-S1). The intervertebral disks function relatively well to withstand compressive forces, but do not function as well to combat twisting or bending forces applied to the axis (straight line down the length) of the spine.

Canine intervertebral disk disease is a disorder manifested by pain, ataxia, paresis, motor paralysis or sensorimotor paralysis, resulting from displacement of part or all of the nucleus of an intervertebral disk. This disorder is commonly seen in chondrodystrophoid breeds such as the dachshund, basset hound and beagle. The most frequently involved disks are in the thoracolumbar (mid-back) region from T11 to L2, but those in the cervical and lumber spine are also commonly affected. There are a number of other common spinal or hip disorders which canines may suffer, such as hip dysplasia. Dysplasia is considered to be a condition caused by improper growth of hip joint components, and may require surgery and extensive rehabilitation.

These types of conditions may require surgery and extensive rehabilitation. It is advantageous to provide some type of support that can be used by an owner to support at least a percentage of the animal's body weight when the animal walks or when the animal is undergoing rehabilitative therapy. For those animals that have undergone surgery, or animals that have suffered a debilitating injury, it is advantageous to provide a support harness that can be used by an owner to support the weight of the animal. Many veterinary professionals use or recommend supporting the animal by using a common household bath towel that is slung beneath the animal's abdomen, and the joined ends are grasped by the owner or handler. Obviously, this method of supporting a dog is less than optimal, and precise control and stability are clearly not capable of being obtained by this traditional method.

There are a number of patents that are directed toward harness and sling devices that utilize power lifting devices to raise four-legged livestock and other large animal off the ground for therapeutic purposes.

Miller, U.S. Pat. No. 1,015,239, discloses a horse swing that includes a canvas belt attached to a pair of longitudinally extending rods each provided with strips of canvas connected to the rods by a first set of straps extending around the rods and having buckles connected to an end of respective straps that overlap the canvas body. Chains extend from each rod to a ring, by which the swing is suspended. A breaching collar strap and a breast collar strap are attached to the canvas body and a back strap is connected to the breaching collar and breast collar.

Dunn, U.S. Pat. No. 1,277,052, discloses a sling that utilizes a double block and tackle hoist to raise a four-legged livestock animal, particularly a horse, off the ground for therapeutic purposes. The sling includes in combination; a breast band to extend in front of the forelegs, a body band, a breeching, strap connections between the breast band and body band, and between the breeching band and body band, and front and rear elevating mechanisms.

Munks, U.S. Pat. No. 4,550,686 discloses a sling that utilizes power lifting means such as a front-end loader and come-a-longs to raise a four-legged livestock animal or other large animal off the ground and hold it there for extended periods. The sling includes a pair of longitudinally extending poles; a plurality of longitudinally spaced, transversely extending straps mounted between the poles; a centrally disposed web extending between adjacent transverse straps for supporting the belly of the animal; a pair of generally longitudinally extending leg straps mounted between the transverse straps. The transverse and longitudinal leg straps and the web collectively define four leg openings and an udder/genital opening.

Alaniz et al, U.S. Pat. No. 5,823,146 discloses an animal restraining device including a restraining litter and a support frame. The frame supports the litter thereon and has features which facilitate an adjusting of the width between support members of the litter and an adjusting of the height of the frame. The litter has leg apertures therein for receiving the legs of an animal and allowing the legs to dangle below the litter. The frame has an entry side for facilitating entry of the litter with an animal therein. The litter containing the animal and legs of the animal is placed through the entry side into the interior of the frame.

Cool, U.S. Pat. No. 6,640,751, discloses an animal support apparatus that is attachable to a mobile support frame for allowing the animal to remain suspended at a predetermined height to facilitate the process of medical rehabilitation. The apparatus includes an elongate flexible sheet member for positioning about a belly and sides of an animal. The sheet member is generally oval-shaped and has a plurality of apertures for receiving the limbs of the animal. The sheet member comprises a substantially flexible cloth material and has a cushioned material attached to an inner side of the sheet member. The sheet member has a plurality of handle sections attachable to the mobile support frame for lifting the sheet member upward such that limbs of the animal are relieved of a portion of the animal's weight to facilitate the process of medical rehabilitation of one of the limbs or other related parts of the animal.

There are also a number of patents that are directed toward pet carriers, harnesses, and sling devices that are routed under the trunk of a smaller animal's body for carrying the animal or assisting a convalescing or injured animal. The following are some examples.

Hugus, U.S. Pat. No. 2,976,840 discloses a suspensory sling for animals which includes a wheeled support frame having a pair of inverted U-shapes roller-equipped end frames connected in spaced relation that extend over an animal, and a flexible sling assembly suspended from the frame for supporting the selected legs of the animal in an elevated position. The flexible sling assembly includes a flexible body part having leg openings, straps for connecting it about the animal, and suspension loops for detachably connecting the sling to the support frame adjacent respective end frames.

Doyle, U.S. Pat. No. 4,644,902 discloses a pet carrier which includes a sling of flexible sheet material having a body portion with holes for receiving the pet's legs and straps extending from the sides of the body portion which are drawn over the pet's body and secured together so that the carrier may be slung over a user's shoulder or arm or carried in the hand. A pair of restraining straps are secured to the body portion outwardly of the leg receiving holes with hook and loop fastening tapes adjustably connecting the restraining straps for snug engagement over the back of the animal to prevent it from retracting its legs from the holes thereby securely retaining the pet in the carrier.

Anderson, U.S. Pat. No. 4,831,967 discloses an animal lift frame that provides a mechanically adjustable support structure for restraint and skeletal support of an animal undergoing veterinary care. The lift frame includes a generally rectangular frame portion with front and rear beam members connected by a center beam, and right and left side rail members. The center beam carries a slidable counter balance/lifting eye member attachable to a center chain for lifting of the entire apparatus by a common hoist means. A series of adjustable length stabilizer straps extend from a point on this center chain to a fixed or adjustable lifting eye on each of the front and rear beam and right and left rail members. A harness or sling for supporting the underside of the animal is removably secured to the right and left rails.

Kitchens, U.S. Pat. No. 5,193,486 discloses a pet carrier that can be selectively converted to a pet jacket. The pet carrier includes a flexible bag-like body member having a neck brace at a forward end, a torso support portion and an integrally formed cu-shaped hind leg support portion at a rearward end. A pair of strap handles are attached to respective sides of the body member. The pet carrier is converted to a pet jacket by reversing and folding the rearward end of the body member over the forward end of the body member.

Manuel, U.S. Pat. Nos. 5,738,043 and 5,894,817 disclose small animal carriers that can also serve as a wearable garment that have left and right side panels, a bottom panel defining therebetween a neck opening, a tail opening, a pair of unrestrained lateral front leg openings, and a pair of lateral unrestrained rear leg openings symmetrically positioned on both sides of the bottom panel. A pair of opposing handles extend outwardly and upwardly from the mid sections of the left and right side panels for hand carrying the animal. Detachable D-rings are provided on the longitudinal edges of the side panels for connecting a leash or a shoulder strap.

Butchko, U.S. Pat. No. 6,216,636, discloses a device for assisting four-legged pets to walk during periods of convalescence from foot, leg, or hip surgery or injury. The device includes a sling portion connected to two opposing handle grips. The sling portion is disposed either under the chest of the animal in the case of debilitated front legs, or under the abdomen in the case of debilitated hind legs, and the handle grips are grasped by the owner help to support or lift either the front or the rear of the pet.

Solze, U.S. Pat. No. 6,631,697 discloses a support for assisting a large dog traveling on an incline which has two handles attached to opposite ends of a flexible fabric or leather support member. The first and second handles are attached to the support member at an angle consistent with the angle of incline to be traversed whereby the weight of the dog is substantially evenly dispersed along the support member where the support member contacts the dog, namely, under the front shoulders and the ribcage. When a lifting force is applied to the handles, the weight of the dog is partially supported and partially transferred to the support member resulting in the necessary support for the animal.

Muckleroy, U.S. Pat. No. 6,802,282 discloses a multi-function pet carrier having a first flexible panel overlapped perpendicularly by a second flexible panel. One of the flexible panels can be formed into pockets for carrying needed articles. The other flexible panel can be cushioned. Corners of the panels are connected with adjustable straps or strap combinations fixed to what are normally corners of the panels to form the pet carrier for wearing in a horizontal position on a bearer's body.

Moore, U.S. Pat. No. 7,325,516 discloses a mobility assistance vest for lame or elderly canines that is placed under the dog, and then right and left side sections are pulled together over the top of the animal and fastened with hook and loop fasteners. A chest section having front shoulder straps is pulled through the front legs and secured to the side sections on either side of the neck. Semi-detachable handle straps at the front legs are crossed to the opposing side and attached with a snap to D-rings on the shoulder handles for the human handler to provide counter weight or upward support as they both descend stairs side-by-side. Alternatively, the detachable handle straps at the front legs can be attached with the snap connector to the D-rings on the rear section of the vest to provide support for assisting the canine while ascending stairs, walking and standing up.

Leo, U.S. Published Patent Applications 2005/0076853 and 2005/0229869, disclose a jacket and a carrying device for domestic animals which includes a flexible element that extends around the body of the animal. A handle which can allow the animal to be carried by the person holding it, is associated with the external surface of the portion of the flexible element which is disposed next to the back of the animal.

Sherman et al, U.S. Published Patent Application 2005/0263102, discloses a wearable, multi-positional apparatus and method for transporting an animal horizontally in an adjustable, body-conforming apparatus worn about the human torso. The carrier consists of a convex shaped main body panel bound at its perimeter by flexible, semi-rigid binding material and cushioned leg openings. The body panel passes beneath and is drawn up around the animal that is secured under its hindquarters and beneath the chest area in front of the forelegs away from the esophageal area with the pet in a natural horizontal level orientation. The carrier has tote-style handles, and a multi-positional strap that permits the carrier to be draped over the shoulder, around a person's waist, across the human chest, or converted to a leash.

Beach et al, U.S. Published Patent Application 2008/0072838, discloses a pet carrier which includes a lateral support panel sized and shaped to fit beneath an abdomen of a pet. The lateral panel has a pair of foreleg openings and a pair of back leg openings sized and disposed to permit entry of the forelegs and back legs of the pet. A front support panel extends forwardly from the lateral panel adjacent the foreleg openings. A rear support panel extends rearwardly from the lateral panel adjacent the back leg openings. Side support panels are located along the sides of the lateral panel. A carrying strap is attached to the pet carrier that includes an adjustable front strap and at least one rear strap. The rear strap is attached at opposite rear corners of the carrier and loops around the front strap to provide for carrying comfort.

Rubinstein et al, U.S. Published Patent Application 2009/0314224 discloses an animal support harness and method of supporting and restraining movement of an animal. The apparatus includes a sling that can be routed around the abdomen of the animal, and a plurality of primary support straps extend from the sling and are joined at a handle. A leash strap is integrated with the handle, and extends to connect to the collar of the animal. The integral leash strap along with the primary support straps enables an owner to control not only an upward supporting force for the animal, but also provides an inherent restraint to prevent an animal from walking too quickly or lunging, which might otherwise harm the animal.

Most of the harness and sling devices that raise four-legged livestock and other large animals off the ground for therapeutic purposes are complex constructions and require power lifting devices or frames to raise and support the animal off the ground, and many incorporate straps and slings that diverge outwardly from the underside of the animal when lifted. Thus, they are not particularly suited for raising and supporting the animal by hand straps or shoulder straps.

Many of the pet carriers, harnesses, and sling devices discussed above that have shoulder straps and carrying handles for lifting and carrying smaller animals do not provide rigid horizontal support means positioned longitudinally above the full length of the animal's back and spine including the shoulder and hip areas and are incapable of evenly distributing the weight of the animal or reducing twisting or bending stresses applied to the axis of the spine.

Other pet carriers, harnesses, and sling devices that assist a convalescing or injured animal utilize straps or relatively narrow sling components that extend around or beneath only a portion of the animal's trunk and when lifted only support a designated portion of the animal's body between the front and rear legs, rather than supporting the full length of the animal's trunk and spine including the shoulder and hip areas. These types of sling devices do not evenly distribute the weight of the animal and can actually cause bending of the spinal column, thus, they are not particularly suited for preventing twisting or bending stresses applied to the axis of the spine nor suitable for lifting the animal completely clear of the ground for carrying.

SUMMARY OF THE INVENTION

The present invention overcomes the aforementioned problems and is distinguished over the prior art in general, and these patents in particular by a carrier sling for transporting and supporting four-legged animals and is particularly suited for use in supporting and assisting in the mobility of injured or convalescent canines suffering from invertebral disk disease or other spinal and hip disorders or recuperating from surgery related thereto.

The carrier sling is formed of a generally rectangular panel of flexible fabric material having opposed longer sides of sufficient length to extend around lateral sides and above the back of the animal, opposed shorter sides of sufficient width to extend along an underside of the animal including shoulder and hip areas of the animal, a pair of foreleg openings, a pair of back leg openings, and a genital opening formed in the panel, and a longitudinally extending loop formed in the panel along each of the shorter sides. A first and a second rigid support rod or tube is disposed in a respective longitudinally extending loop with opposed outer ends thereof extending outwardly of the longitudinally extending loop, and an end cap is mounted on the respective opposed outer ends.

An inverted generally U-shaped webbing strap handle secured to each shorter side of the panel intermediate the longer sides has lower ends straddling the longitudinally extending loop and support rod or tube disposed therein and is secured together above and below the longitudinally extending loop and support rod or tube disposed therein so as to draw the support rods or tubes together in a generally parallel horizontal relation with one another when the handles are placed together and gripped by a user in a lifting and supporting position.

A first and a second webbing strap secured to each shorter side of the fabric panel near a corner thereof each has lower ends straddling the longitudinally extending loop and support rod or tube disposed therein and is secured together above and below the longitudinally extending loop and support rod or tube disposed therein. A rigid generally rectangular loop member is secured at a first side in an upper end of each strap above the longitudinally extending loop and support rod or tube disposed therein. An elongate adjustable length shoulder strap formed of webbing is mounted through the rigid rectangular loop members so as to draw the support rods or tubes together in a generally parallel horizontal relation with one another in a lifting and supporting position.

In the lifting and supporting position, the forelegs and back legs of the animal extend through the foreleg and back leg openings, and the sling extends along the underside of the animal's trunk including shoulder and hip areas to support the weight of the animal's body and around the lateral sides of the animal to evenly distribute the weight of the animal, and the rigid support rods or tubes are disposed closely together in a generally parallel horizontal relation and extend longitudinally above the length of the animal's back and spine to prevent twisting or bending stresses applied to the axis of the animal's spine.

One of the significant features and advantages of the present carrier sling is that it provides a means for carrying and comfortably supporting animals off the ground and is particularly suited for transporting, supporting, and assisting in the mobility of injured or convalescent canines suffering from invertebral disk disease or other spinal, hip, or leg injuries or recuperating from surgery related thereto where it is important to control the stress on the spinal column and/or the amount of weight put on the limbs to promote healing.

Another significant feature and advantage of the present carrier sling is that it incorporates a pair of rigid support rods or tubes that are connected with the handle and shoulder strap and, when the animal is supported in the sling and lifted by the handles or shoulder strap, are positioned closely together substantially parallel with one another and extend longitudinally above the full length of the animal's back and spine including the shoulder and hip areas so as to evenly distribute the weight of the animal and significantly reduce twisting or bending stresses applied to the axis of the spine.

Another feature and advantage of the present invention is that it incorporates a sling that extends along underside of the animal including shoulder and hip areas of the animal, and around the lateral sides of the animal, and has a pair of foreleg and back leg openings through which the legs of the animal extends to evenly distribute the weight of the animal and significantly reduce twisting or bending stresses applied to the axis of the spine when lifting or supporting the animal completely clear of the ground such as when being carried.

Another feature and advantage of the present invention is that it has luggage type handles and a shoulder strap that allow the animal to be carried and comfortably supported off the ground and control the amount of weight put on the limbs during walking or therapeutic exercise to promote healing.

A further feature and advantage of the present invention is that it incorporates a sling that has a genital opening to allow the animal to relieve itself while being supported.

A still further feature and advantage of the present invention is that it is simple in construction, inexpensive to manufacture, and safe and reliable in use.

Other features and advantages of the invention will become apparent from time to time throughout the specification and claims as hereinafter related.

DESCRIPTION OF THE PREFERRED EMBODIMENT

Referring to the drawings by numerals of reference, there is shown in FIGS. 1-6, a preferred carrier sling 10 in accordance with the present invention. The carrier sling 10 may be used to carry, support and lift any four-legged animal, and is particularly suited for use in carrying, supporting, and lifting injured or convalescent canine pets and assisting the mobility of a canine suffering from invertebral disk disease or other spinal and hip disorders or recuperating from surgery related thereto.

Figure 1:
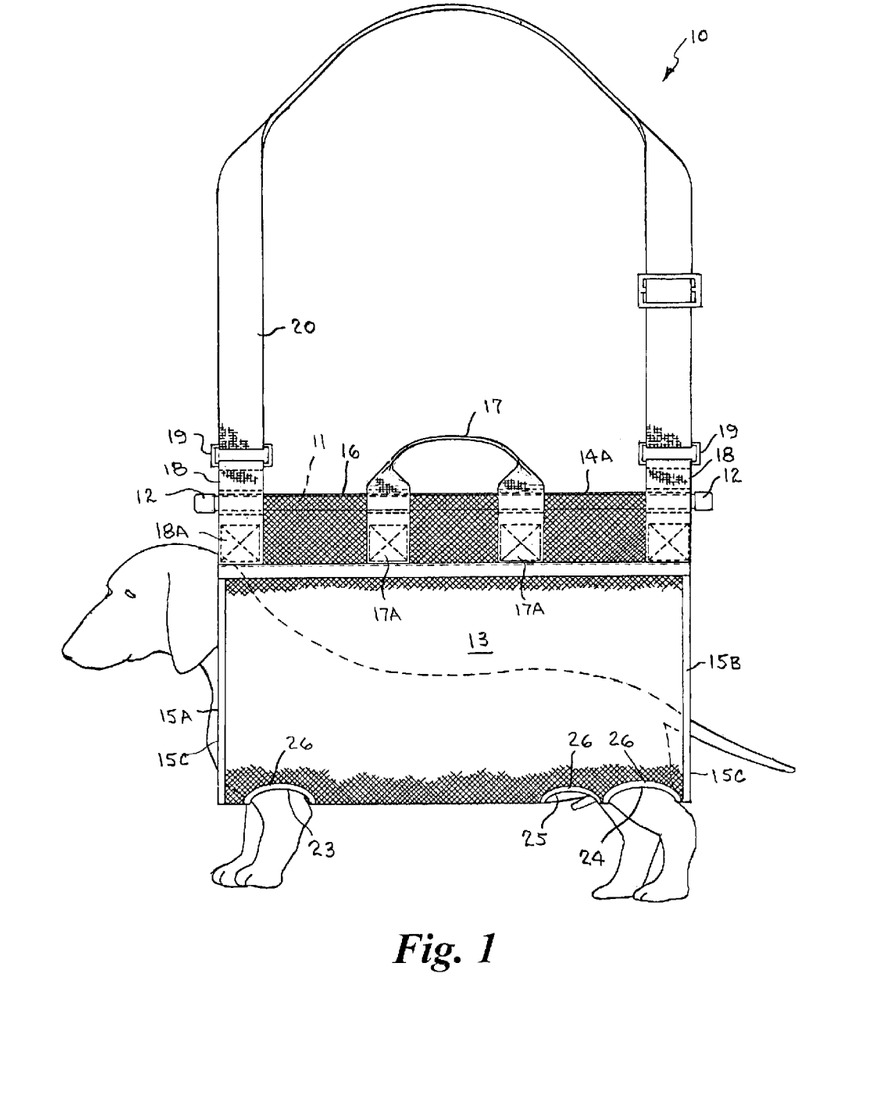
FIG. 1 is a side elevation view of the carrier sling in accordance with the present invention showing a canine being supported thereby.
Figure 2:
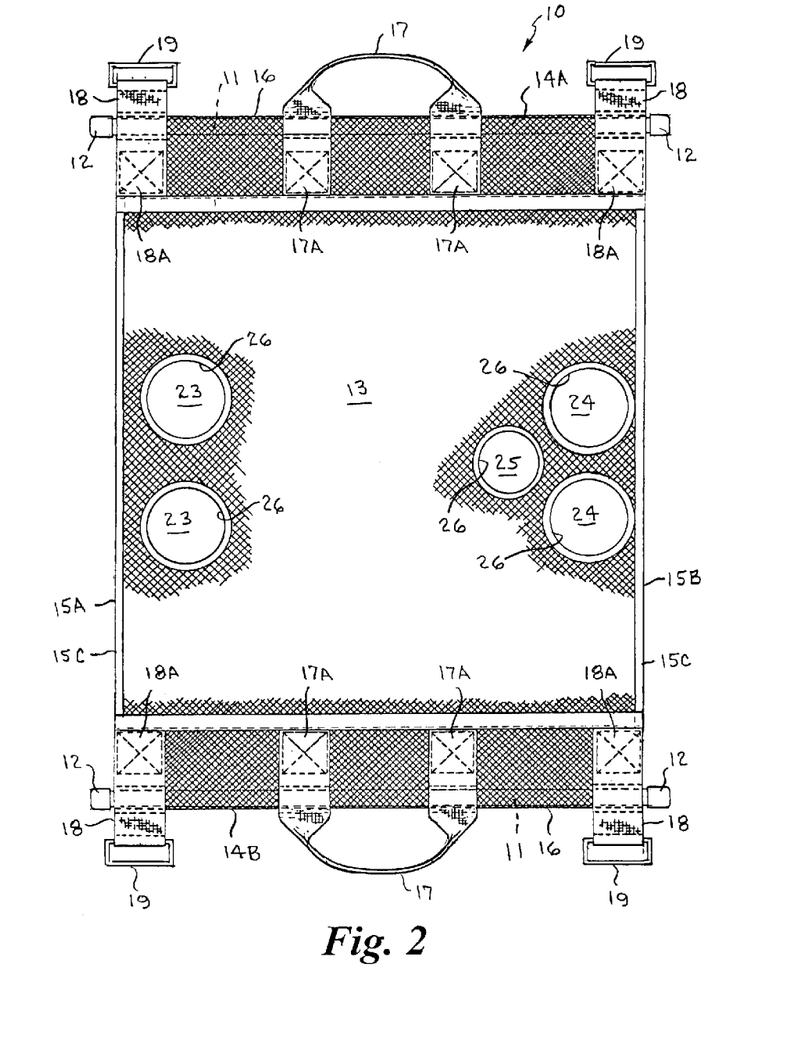
FIG. 2 is plan view of the carrier sling in a flat condition with the shoulder strap removed more clearly showing the leg and genital openings.
Figure 3:
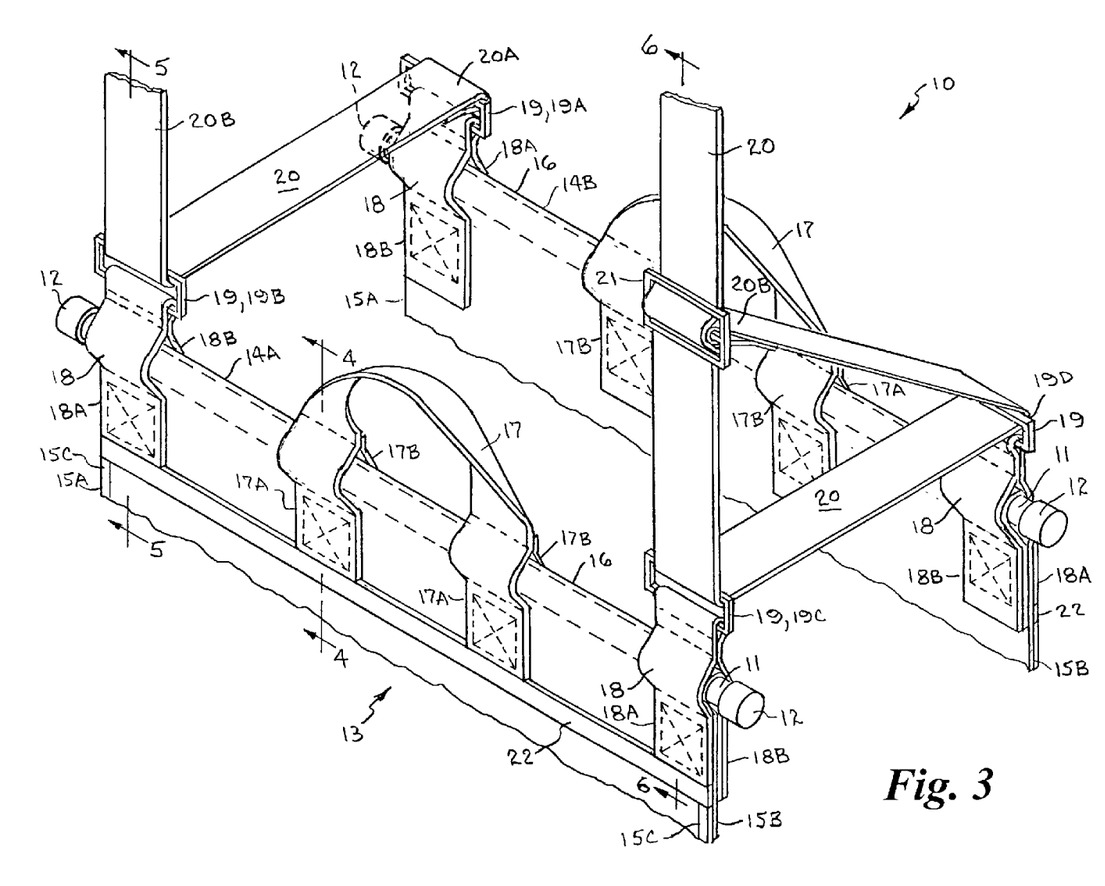
FIG. 3 is a perspective view of the upper portion of the carrier sling the support rods or tubes positioned a distance outward apart showing a portion of the shoulder strap fed through the rectangular loop members.

The carrier sling 10 includes a pair of longitudinally extending rigid support rods or tubes 11 of sufficient length and rigidity to support the weight of the type of animal for which the sling is to be used. For example, it has been found that one-half inch diameter PVC tubing approximately from about 15 inches to about 18 inches in length is suitable for supporting a fully grown dachshund, in the manner described hereinafter. A pair of end caps 12 are mounted on the respective opposed ends of each support rod or tube 11.

A fabric sling 13 formed of a generally rectangular panel of flexible fabric material having opposed shorter sides 14A, 14B and opposed longer front and rear sides 15A, 15B is mounted at each shorter side 14A, 14B on a respective support rod or tube 11 to extend therebetween. As described hereinafter, in use, the fabric sling 13 forms a loop between the support rods or tubes 11 to support the underside of the animal, such as a canine, which is to be supported, lifted or carried by the sling.

As used hereinafter in conjunction with the present invention, the term "width" means the distance between the opposed longer front and rear sides 15A, 15B and the term "length" means the distance between the opposed shorter sides 14A, 14B. The "width" of the fabric sling 13 (between opposed front and rear sides 15A, 15B) is sufficient to extend along an underside of the animal including shoulder and hip areas of the animal, and the "length" (distance between opposed shorter sides 14A, 14B) is sufficient to extend around lateral sides of and above the back the animal.

The fabric sling 13 is preferably formed of a flexible unidirectional (one-way) stretch fabric material that allows stretching only in the direction along the "width" (between opposed front and rear sides 15A, 15B), but not in the transverse direction across the "length" (between opposed shorter sides 14A, 14B). The fabric material of the sling 13 is also preferably a mesh that provides a plurality of small openings therethrough. Alternatively, the sling 13 may be formed of a non-stretch fabric material that resists stretching in both directions. A narrow strip of flexible fabric edging material 15C may be folded over the outer edge of each of the longer front and rear sides 15A and 15B of the fabric sling 13 and secured in the folded configuration by sewing or other conventional fastening means.

Figure 4:
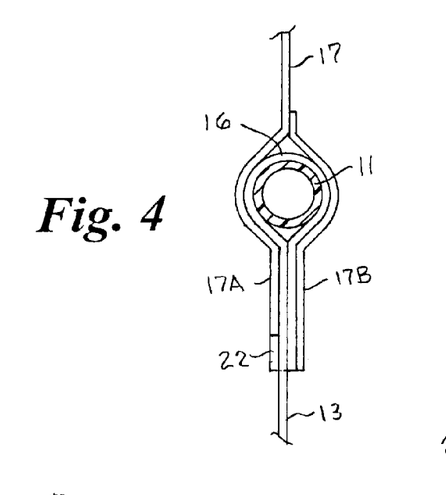
FIG. 4 is a longitudinal cross section view taken along line 4-4 of FIG. 3 showing the handle mounted to the sling to reside over the outer loop and support rods or tubes.

The outer edge of each shorter side 14A and 14B of the fabric sling 13 is folded over and secured to itself in the folded configuration by sewing or other conventional fastening means. The folded over portion of each shorter side 14A, 14B is then sewn together again a short distance from the outer folded portion to form a small outer loop 16 slightly larger than the diameter of the support rod or tube 11 to be slidably received thereon.

An inverted generally U-shaped webbing strap handle 17 is secured to each shorter side 14A, 14B of the fabric sling 13 intermediate the opposed longer sides 15A and 15B. The lower ends of each handle 17 has a pair of opposed relatively short webbing straps 17A and 17B that are received over the small outer loop 16 and the folded over portion of each shorter side 14A and 14B. The short webbing straps 17A and 17B straddle the outer loop 16, and are sewn together by stitching above the small outer loop, and locations below the loop where the folded over portion of each shorter side 14A and 14B is sewn together.

Figure 5:
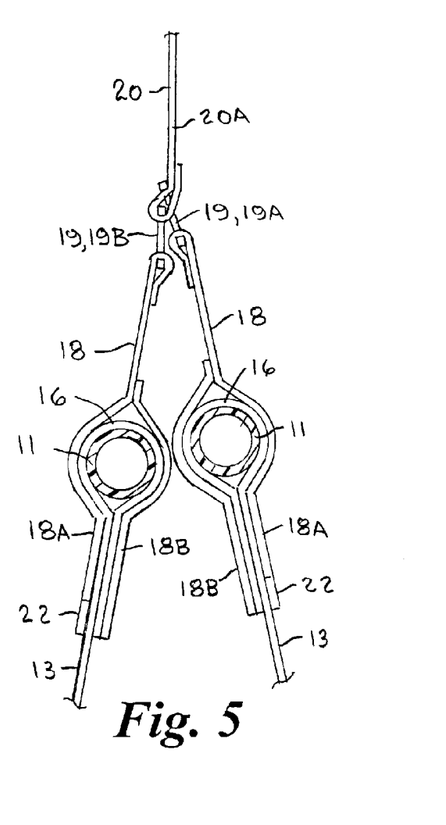
FIG. 5 is a longitudinal cross section view taken along line 5-5 of FIG. 3 showing the shoulder strap fed through the rectangular loop members at a first end of the sling and the support rods or tubes positioned closely together portion in a supporting position.
Figure 6:
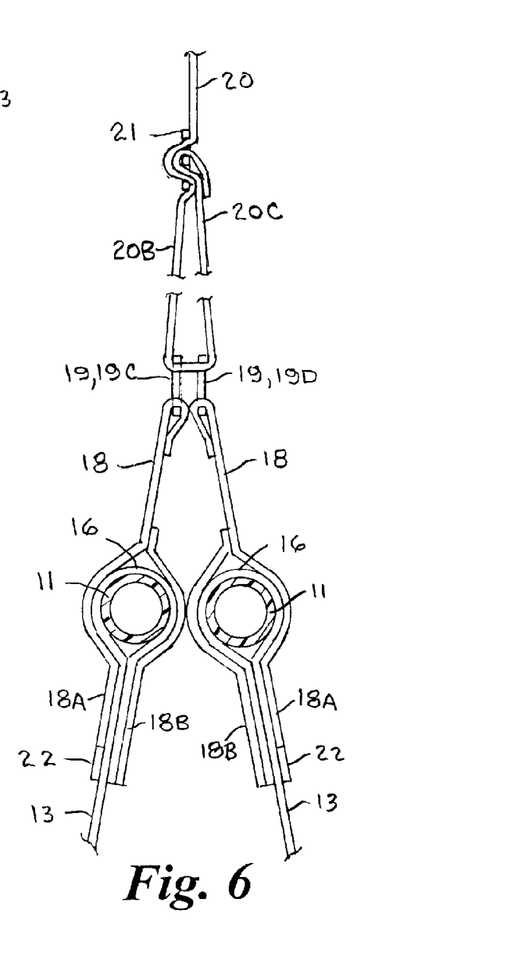
FIG. 6 is a longitudinal cross section view taken along line 6-6 of FIG. 3 showing the shoulder strap fed through the rectangular loop members at a second end of the sling and the support rods or tubes positioned closely together portion in a supporting position.

A webbing strap 18 carrying a standard rigid generally rectangular loop member 19 is secured along each shorter side 14A and 14B near the corners of the fabric sling 13 to extend above the shorter sides. The webbing strap 18 is fed through a first side of the rectangular loop member 19, folded over itself and sewn together by stitching just below the first side of the rectangular loop member to secure the rectangular loop member onto the strap. The pair of opposed lower ends 18A, 18B of each strap 18 straddle the small outer loop 16 of the fabric sling 13 and the folded over portion of each shorter side 14A, 14B of the sling, and are sewn together by stitching at locations below the loop member 19 where the folded over portion of each shorter side of the sling is sewn together. Thus, a rigid rectangular loop member 19 is disposed just above the small outer loop 16 at each corner of the sling 13. When the support rods or tubes 11 are approximately parallel with one another, the rectangular opening in opposed pairs of the rectangular loop members 19 are disposed in generally parallel alignment above the outer loop 16 of the sling 13.

An adjustable shoulder strap 20 formed of an elongate webbing strap is connected through the rigid rectangular loop members 19. The first end 20A of the shoulder strap 20 is fed through the second side of one rectangular loop member 19A, folded over itself and sewn together by stitching to secure the first end of the shoulder strap to the rectangular loop member 19. The second end 20B of the shoulder strap 20 is fed through the opposed rectangular loop member 19B at one end of the sling, through a single bar slide 21, and through both of the opposed rectangular loops 19C and 19D at the opposed end of the sling to form an elongate loop. The terminal end 20C of the second end 20B of the shoulder strap 20 is looped over itself and secured to the middle bar of the bar slide 21 by stitching. The length of the shoulder strap 20 can be adjusted by moving the bar slide 21 in a conventional manner.

A strip of fabric trim material 22 may be sewn to each outer facing side of the sling 13 between the longer sides 15A, 15B at the terminal ends of the short webbing straps 17A of the handles 17 and the straps 18A carrying the rectangular loop members 19.

A pair of front leg openings 23 disposed a distance inwardly from the front longer side 15A extend through the sling 13, a pair of rear leg openings 24 extend through the sling near the rear longer side 15B, and a genital opening 24 extends through the sling a distance inwardly from the rear leg openings. A narrow strip of flexible fabric edging material 26 is folded over the inner edge of each of the openings, 23, 24, and 25, in the fabric sling and secured in the folded configuration by sewing or other conventional fastening means. The unidirectional stretch fabric of the sling 13 in the direction along the length (between opposed front and rear sides 15A, 15B) allows the distance between the front and rear leg openings 23 and 24 to accommodate the legs of longer animals.

The length of the fabric sling 13 between opposed front and rear sides 15A, 15B is sufficient to extend along the underside of the animal's trunk and spine including the shoulder and hip areas to support the animal's body, and the width between the opposed shorter sides 14A, 14B is sufficient to extend around the sides of the animal, so as to evenly distribute the weight of the animal and significantly reduce twisting or bending stresses applied to the axis of the spine when lifting or supporting the animal completely clear of the ground such as when being carried.

It should be understood from the foregoing that the support rods or tubes 11 are slidably disposed in the small outer loop 16 of the sling 13 and straddled by the short webbing straps 17A, 17B of the handles 17 and the straps 18 carrying the rectangular loop members 19 that are stitched together above and below the small outer loop of the sling. The end caps 12 are disposed at the opposed ends of the support rods or tubes 11 just outwardly from each corner of the sling 13.

One of the important features of the present carrier sling 10 is that when the animal is supported in the sling and lifted by the carrying handles 17, or carried by the shoulder strap 20, the rigid support rods or tubes 11 will be positioned closely together substantially parallel with one another and extend longitudinally above the full length of the animal's back and spine including the shoulder and hip areas so as to evenly distribute the weight of the animal and significantly reduce twisting or bending stresses applied to the axis of the spine.

This feature is particularly important where the carrier sling is being used to support a canine suffering from invertebral disk disease or other spinal, hip, or leg injuries or recuperating from surgery related thereto where it is important to control the stress on the spinal column and/or the amount of weight put on the limbs to promote healing.

The carrier sling 10 allows the animal to be lifted completely off the ground, and can be lifted and supported by the handles 17 or on the shoulder of the user by the shoulder strap 20. The handles 17 may be used to lift and hold the animal for short trips, and the shoulder strap 20 may be used to support the animal's weight for longer trips, or used as a leash for exercise or walking the animal. The carrier sling 10 may also be lifted by the handles 17 or shoulder strap 20 to control the amount of weight placed on the limbs and stress on the spine so that it may be exercised or walked without putting the animal's full weight on the injury. The shoulder strap 20 may also be placed over an elevated support to suspend the animal off the ground for extended periods during recovery from an injury or recuperating from surgery.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A carrier sling for supporting and carrying a four-legged animal off the ground and preventing bending stresses along the axis of the animal's spine, comprising:
   a sling formed of a generally rectangular panel of flexible stretch resistant fabric material having opposed front and rear longer sides of sufficient length to extend around lateral sides and a distance above the back and spine of the animal, opposed shorter sides at each end thereof of sufficient width to extend along an underside of the animal including shoulder and hip areas of the animal, and a longitudinally extending loop formed along outer ends of each of said shorter sides, said stretch resistant material being resistant to stretching and deformation in at least the direction that extends around the lateral sides and a distance above the back and spine of the animal;
   a pair of foreleg openings and a pair of back leg openings formed in said panel for receiving forelegs and back legs of the animal, and a genital opening formed in said panel a distance inwardly from said back leg openings,
   a first and a second rigid support rod or tube each disposed in a respective said longitudinally extending loop with opposed outer ends thereof extending outwardly of said longitudinally extending loop, and an end cap mounted on the respective opposed outer end;
   a pair of inverted generally U-shaped webbing strap handles, each secured to a respective said shorter side of said panel intermediate said longer front and rear sides, each said handle having a lower portion straddling said longitudinally extending loop and secured together above and below said longitudinally extending loop and said rigid support rod or tube disposed therein, such that when said handles are placed together and gripped by a user in a lifting and hand supporting position, said rigid support rods or tubes are drawn together in a generally parallel horizontal relation with one another;
   a first and a second webbing strap secured to each of said shorter sides adjacent a corner thereof, each having lower ends straddling said longitudinally extending loop and secured together above and below said longitudinally extending loop and said rigid support rod or tube disposed therein, and each having a rigid generally rectangular loop member with a first side secured in an upper end thereof above said longitudinally extending loop and said support rod or tube disposed therein; and
   an elongate adjustable length shoulder strap formed of webbing mounted through each said rigid rectangular loop member such that said rigid support rods or tubes are drawn together in a generally parallel horizontal relation with one another in a lifting and shoulder supporting position;

in either of said lifting and hand supporting position or lifting and shoulder supporting position, the forelegs, back legs, and genitalia, of the animal extend through said foreleg, back leg, and genital openings, said sling extends around the lateral sides of the animal and along the underside of the animal's trunk including the shoulder and hip areas to evenly distribute and support the weight of the animal's body, and said rigid support rods or tubes are disposed closely together in a generally parallel horizontal relation a distance above the animal's back and spine and extend longitudinally substantially the length of the animal's back and spine; such that the combination of said rigid support rods or tubes above the length of the animal's back and spine and the stretch resistant properties of said flexible stretch resistant fabric material disposed along the underside and around lateral sides of the animal's trunk including the shoulder and hip areas substantially prevents sagging and maintains the axis of the animal's spine substantially straight to prevent bending stresses along the axis of the animal's spine.

2. The carrier sling according to claim 1, wherein said flexible stretch resistant material is a mesh material having a plurality of small openings therethrough.

3. The carrier sling according to claim 1, wherein said panel of flexible fabric is formed of a stretch resistant material that resists stretching both in the direction between said opposed front and rear sides, and in the direction between said opposed shorter sides.

4. The carrier sling according to claim 1, wherein a first end of said shoulder strap is secured to a second side of one said rectangular loop member and a second end of said shoulder strap passes through an opposed facing rectangular loop member at one end of said sling, through a bar slide member, and through both opposed facing rectangular loop members at the opposed end of said sling to form an elongate loop, and the terminal end of said second end of said shoulder strap is looped over itself and secured to a middle bar of said bar slide, such that the length of said shoulder strap can be selectively adjusted by positioning said bar slide thereon.

5. The carrier sling according to claim 1, further comprising;

a strip of flexible fabric material folded over and secured to an outer edge of each of said opposed shorter sides, said opposed front and rear longer sides of said panel, respectively, and a strip of flexible fabric material folded over and secured to an inner edge of each of said foreleg openings, said back leg openings, and said genital opening, respectively.

* * * * *